United States Patent [19]

Schmaus

[11] Patent Number: 4,690,000

[45] Date of Patent: Sep. 1, 1987

[54] DIRECT-ACTING PRESSURE SENSOR

[76] Inventor: Siegfried H. A. Schmaus, 806 Powder Mill La., Penfield Downs, Philadelphia, Pa. 19151

[21] Appl. No.: 875,959

[22] Filed: Jun. 19, 1986

[51] Int. Cl.⁴ ............................................. G01L 7/04
[52] U.S. Cl. ........................................ 73/741; 73/731
[58] Field of Search ................... 73/741, 731, 732–740

[56] References Cited

U.S. PATENT DOCUMENTS

| 2,409,161 | 10/1946 | Sivertsen | 73/741 |
| 3,561,330 | 2/1971 | Rich | 73/741 |
| 4,015,478 | 4/1977 | Schmaus | 73/741 |

Primary Examiner—Donald O. Woodiel
Attorney, Agent, or Firm—Michael Ebert

[57] ABSTRACT

A direct-acting pressure sensor capable in the low-pressure range and including a pressure-sensitive assembly constituted by inner and outer concentrically-arranged curved springs anchored at one end in a socket to define a pressure region therebetween, within which is disposed an elongated, flexible bladder forming an internal pressure chamber communicating with a fluid input socket. The springs are joined at their free end to form a tip whose travel is indicative of the pressure of fluid applied to the sensor. The bladder initially assumes a curved form conforming to the curvature of the springs; but when subjected to internal pressure by an applied fluid, it seeks to straighten out to an extent determined by the level of pressure. The elongated bladder is formed by an elastomeric sleeve incorporating a helical reinforcing coil whereby when subjected to internal pressure, it is free to flex and straighten out, but is prevented by the coil from dilating, thereby maintaining a proportional relationship between the applied pressure and the indication thereof to provide an accurate reading.

5 Claims, 6 Drawing Figures

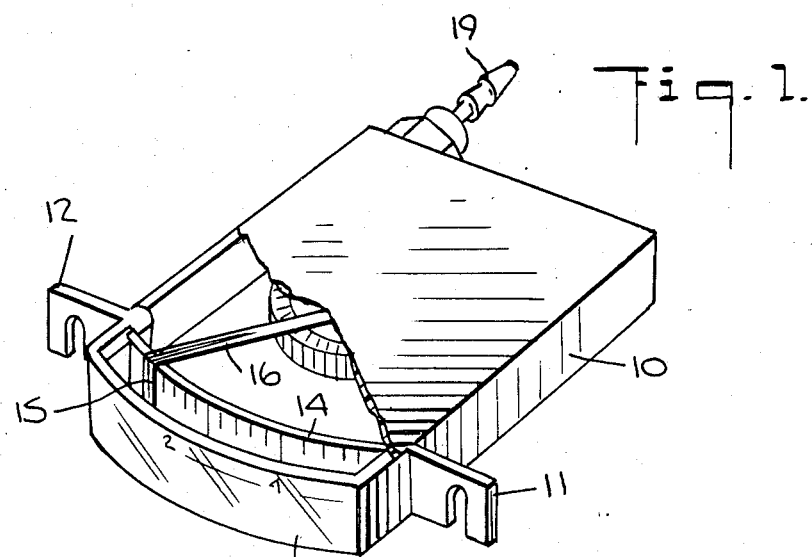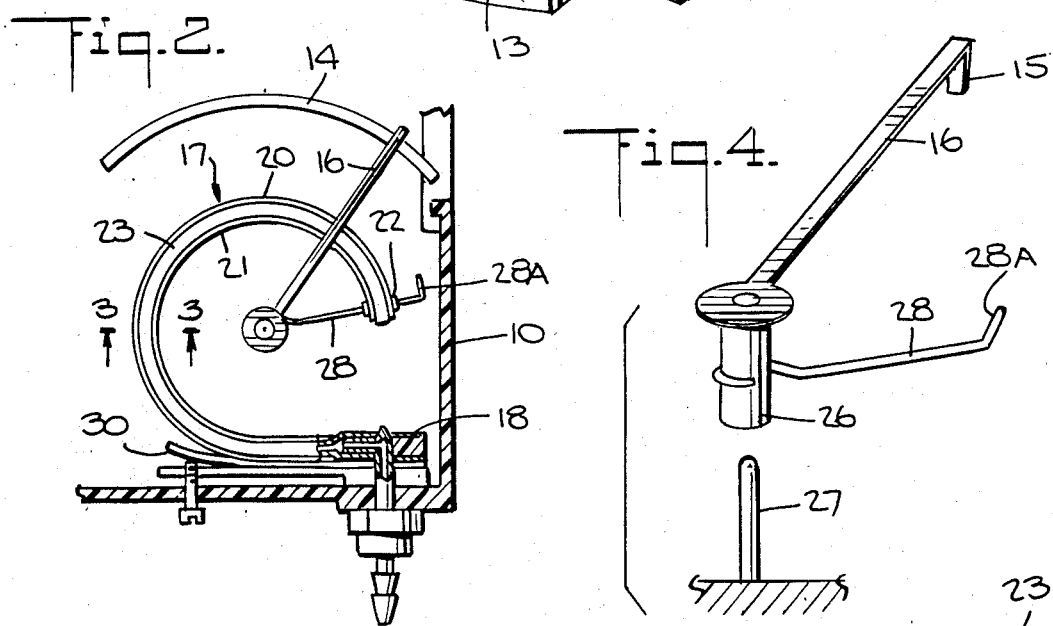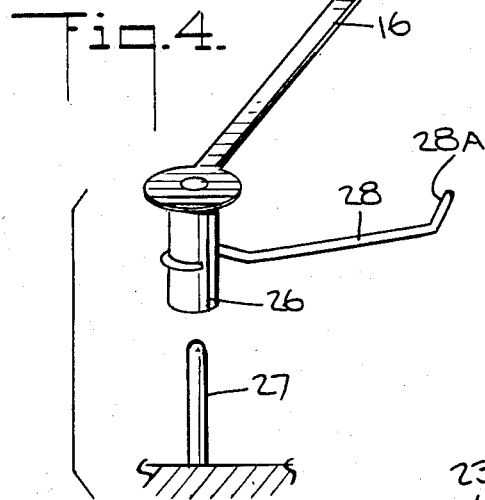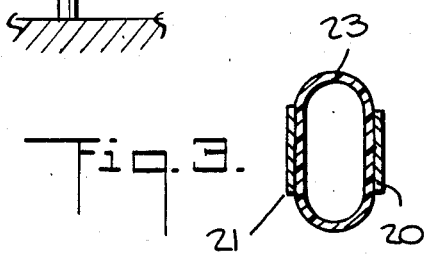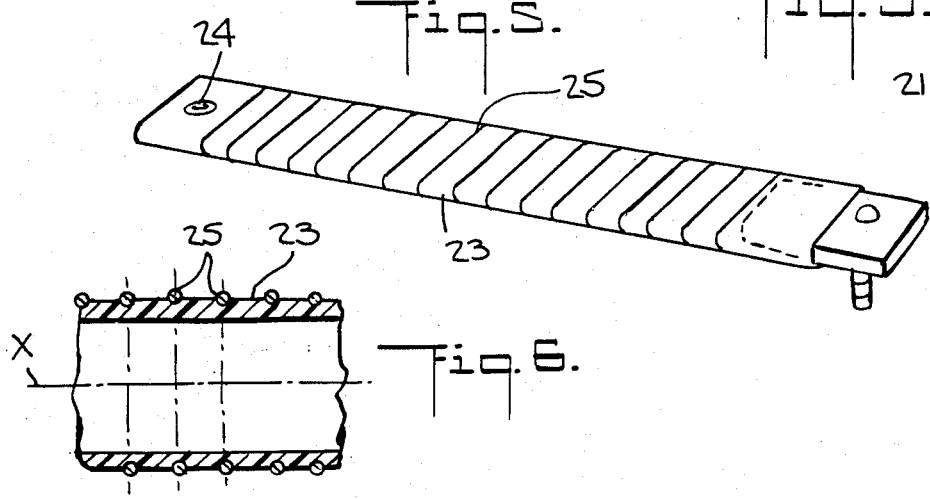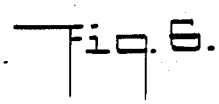

DIRECT-ACTING PRESSURE SENSOR

BACKGROUND OF INVENTION

1. Field of Invention:

This invention relates generally to pressure gauges, and more particularly to an accurate, direct-action pressure sensor usable in the low pressure range and including a pressure-responsive bladder made of elastomeric material reinforced by a helical coil which does not impede flexing of the bladder but prevents dilation thereof, thereby maintaining a proportional relationship between the applied pressure and the indication thereof.

2. Status of Prior Art:

Measurement of absolute pressure, gauge pressure, vacuum and draft pressure, and differential pressure, is carried out by two primary types of pressure-sensitive elements; the first being the liquid column in which the height and density of the liquid are utilized to measure pressure; the second being the elastic pressure device. The sole concern of the present invention is with elastic pressure elements which are designed to follow the physical law that within an elastic limit, stress is proportional to strain; hence deflection is proportional to applied pressure.

The Bourdon tube, because of its stability, simplicity and high pointer torque, is widely used as a pressure or vacuum indicator. The operation of the Bourdon tube is based on the principle that an elastic tube having an internal cross-section that is not a perfect circle, if bent or distorted, has the property of changing its shape with internal pressure variations. This internal pressure causes the cross-sectional form to become more circular, giving rise to a motion of the closed end or tip of the tube if the open end is rigidly fixed, this motion being usually referred to as "tip travel."

While Bourdon tubes are capable of operating within various pressure ranges running as high as 100,000 psi, in no instance is it possible, as a practical matter, to operate such tubes below 12 or 15 psi. Hence, despire the advantages of Bourdon tubes, they are not effective as gauges in the low-pressure range, and it has heretofore been necessary to employ costly and relatively fragile bellows or diaphragm-sensing elements to effect measurement in this range.

My prior U.S. Pat. Nos. 3,603,153; 3,732,733 and 4,015,478 disclose a low-cost pressure sensor capable of accurately gauging pressure in the low pressure range. The sensors disclosed in these patents include two curved flat metal springs in a concentric arrangement wherein the springs are cantilevered from a socket, the free end of the springs being joined together at a tip from which a pointer extends. The springs enclose a flexible bladder having an internal chamber which communicates with the socket, whereby fluid fed through the socket into this chamber acts to expand the bladder and causes the springs to uncurl, thereby moving the tip and the pointer attached thereto as a function of the applied pressure. Also of prior art interest is my U.S. Pat. No. 3,486,400.

In a conventional Bourdon tube pressure gauge, the relationship between applied fluid pressure and tip travel is such that it takes a large pressure change to effect a relatively small tip movement. Consequently, commercial forms of such gauges include gear works or linkages to mechanically magnify the tip travel. This friction introduced by mechanical amplifiers usually makes it necessary to tap the gauge to cause it to register. Such tapping is unnecessary with a sensor of the type disclosed in my prior patents, for no mechanical amplification is entailed. The sensor is highly sensitive so that a small change in applied pressure gives rise to a relatively large excursion of the tip.

The bladder disclosed in my prior patents is made by uniformly coating a fabric sleeve formed from woven, synthetic fibers such as polyester "DACRON" fibers, with silicone rubber. To create the bladder, one end of the reinforced sleeve is sealed, whereas the other end remains open and communicates with a pressure input socket.

Ideally, a bladder of this type should be highly flexible but non-dilatable so that the internal surface area of the pressure chamber created by the bladder is constant and unaffected by fluid pressure. In this ideal form, the effect of fluid pressure on the bladder sandwiched between the C-shaped inner and outer springs is to more or less straighten out the bladder against the tension of these springs, in which case a proportional relationship will exist between the degree of applied pressure and the indication thereof that is determined by the extent to which the bladder straightens out.

But with a bladder formed by an elastomer-coated woven sleeve, this sleeve is not entirely effective in resisting dilation of the bladder. The reason for this is that the intersecting warp and woof threads of the sleeve, when subjected to internal pressure, are caused to change their angular relationship, and some dilation of the sleeve results from this action. This dilation adversely affects the accuracy of the sensor.

Also an elastomeric bladder reinforced by a fabric sleeve is not as flexible as one that is free of such woven reinforcement, for the weave of the sleeve somewhat resists flexure and this impairs the sensitivity of the sensor and introduces hysteresis.

SUMMARY OF INVENTION

In view of the foregoing, the main object of this invention is to provide a fluid pressure sensor which includes an elongated bladder formed of an elastomeric sleeve incorporating a helical reinforcing coil, whereby the bladder is flexible but non-dilatable.

More particularly, an object of this invention is to provide a sensitive, efficient and reliable pressure sensor in which a proportional relationship exists between the degree of applied input pressure and the pressure indication, whereby the sensor is highly accurate.

Among the significant advantages of a sensor in accordance with the invention are compactness, high life expectancy, and the fact that the sensor lends itself to edgewise mounting.

Briefly stated, these objects are attained in a direct-acting pressure sensor capable in the low-pressure range and including a pressure-sensitive assembly constituted by inner and outer concentrically-arranged curved springs anchored at one end in a socket to define a pressure region therebetween, within which is disposed an elongated, flexible bladder forming an internal pressure chamber communicating with a fluid input socket. The springs are joined at their free end to form a tip whose travel is indicative of the pressure of fluid applied to the sensor. The bladder initially assumes a curved form conforming to the curvature of the springs; but when subjected to internal pressure by an applied fluid, it seeks to straighten out to an extent determined by the level of pressure. The elongated bladder is formed by an elastomeric sleeve incorporating a helical reinforcing coil whereby when subjected to internal pressure, it is free to flex and straighten out, but is prevented by the coil from dilating, thereby maintaining a proportional relationship between the applied pressure and the indication thereof to provide an accurate reading.

OUTLINE OF DRAWINGS

For a better understanding of the invention as well as other objects and further features thereof, reference is made to the following detailed description to be read in conjunction with the accompanying drawings, wherein:

FIG. 1 is a perspective view of the sensor with the top panel of its case partially cut away to expose a portion of the internal structure;

FIG. 2 shows, partly in section, the internal structure of the sensor;

FIG. 3 is a transverse section, taken in the plane indicated by lines 3—3 in FIG. 2;

FIG. 4 is a separate view of the pointer mounting for the sensor;

FIG. 5 is a perspective view of the bladder included in the sensor; and

FIG. 6 is a longitudinal section taken through the bladder.

DESCRIPTION OF INVENTION

Referring now to FIG. 1, there is shown a pressure sensor in accordance with the invention, the sensor being housed in a generally rectangular case 10, molded or otherwise, formed of synthetic plastic material and provided on either side with mounting lugs 11 and 12 adjacent the front end of the case. Thus, the sensor can be mounted on a panel with the front end thereof protruding through a slot cut in the panel.

The front end of the case is provided with a transparent arcuate strip 13 of plastic material to provide a window through which is visible an arcuate scale 14 graduated in pressure values, such as 0 to 6 psi, parallel to the window. Swingable along this scale is the downwardly bent tip 15 of a pointer 16.

Disposed within case 10, as shown in FIG. 2, is a pressure-sensitive assembly, generally identified by reference numeral 17, which is anchored at one end of a socket 18 secured to the case. Socket 18 is coupled to a hose connector 19 that projects from the rear end of the case, whereby fluid under pressure may be admitted to the pressure-sensitive assembly.

Assembly 17 is constituted by two flat springs 20 and 21, both having the same tapered width but differing in length so that the springs, which may be made of any suitable metal alloy of the types currently employed in bourdon tubes, have different spring characteristics or spring rates. Springs 20 and 21 may be of metallic or plastic material, both having a similar C-formation, the two springs being concentrically disposed and being anchored at one end in socket 18. At their free end, the springs are joined together by a hollow rivet 22 to form the tip of the pressure sensitive element. An elongated bladder 23 communicating with socket 18 is interposed between springs 20 and 21, the free end having an eyelet 24 therein which is secured to rivet 22.

The springs are preferably fabricated of Ni-Span "C," which though relatively costly nevertheless effects overall economies in meeting certain production problems as compared to less expensive metals such as stainless steel, phosphor bronze, or beryllium copper. Ni-Span "C," when cold-worked and then heated-treated, has been found to have superior hysteresis and spring characteristics over long service, as well as good thermal stability over a temperature range of −40° F. to +160° F.

Bladder 23 is constituted by a reinforced elastomeric material so that the cross-sectional area of the bladder is constant and unaffected by pressure. The only effect of pressure on the bladder which is caused to by the springs to initially assume a humped form is to try to straighten out the bladder against the tension of the springs. The bladder is preferably bonded to the springs to avoid slide friction therebetween and thereby minimize hysteresis.

Bladder 23 is formed of a sleeve of elastomeric material such as neoprene rubber, about which is wound a helical coil 25 of synthetic plastic wire, such as a polyester "Dacron" mono-filament made from polyethylene terephthalate which is highly flexible. The filament is stretch-oriented so that it is not stretchable.

To coil the wire about the sleeve, the sleeve is supported on a mandrel in a conventional coiling machine, and rotated to cause the wire which is drawn from a reel to form successive equi-spaced convolutions on the sleeve. To bond the resultant coil to the sleeve without impairing the flexing characteristics thereof, the coil is then uniformly coated with a curable silicone rubber solution or other adhesive material that is highly flexible and is compatible with the rubber of the sleeve.

One end of the bladder is sealed, the other end being open and communicating with the socket. The resultant bladder, while highly flexible, is non-dilatable, so that the internal surface area of the pressure chamber is unaffected by fluid pressure. The pressure chamber is uncompromised by spring requirements, it is free of aging and stiffness from −40° to +200° F. and is unaffected by aqueous solutions, salts, mild acids and mild alkalies. Because the bladder is bonded to the springs, there is no slide friction therebetween and hysteresis is minimized.

The reason the bladder is non-dilatable and maintains a uniform internal cross-sectional area that is unaffected by pressure is that the convolutions of coil 25 all lie in planes P that, as will be evident in FIG. 6, are almost normal to the longitudinal axis X of the bladder and therefore are highly resistant to pressures which seek to dilate the bladder. But because these convolutions are spaced from each other and are joined together by the elastomeric material of the sleeve, they do not impede flexure of the sleeve.

In this fluid pressure sensor employing C-shaped springs, it is possible by selecting proper values for thickness and length to keep fibre stresses in these springs below 30% of the proportional elastic limit, except in higher pressure ranges where the spring thickness has to be thicker. A tapered flat cantilever spring is relatively simple to manufacture, for the stock for this material is readily available in sheet or strip form in cold worked condition.

The thickness of commercially available stock is highly uniform. Thus, Ni-Span "C" material can be purchased with ±0.0001 inch tolerance at a premium price, thereby affording closer control in final calibration. The physical dimensions of the springs are readily controlled because they may be stamped or photo-etched. Because the springs are free of complicated bends, premature stress failure is avoided.

In contradistinction, a Bourdon tube pressure gauge, though simple in appearance, is a highly complex spring; and when internal pressure is applied, the flat faces of the tube bulge, giving rise to a high stress concentration at the two edge radii which join the flat faces of the tube. These two edge radii in a Bourdon tube are highly critical, whereas the equivalent radii in an elastomeric bladder in accordance with the invention are not at all critical. Indeed, a sensor of a given size in accordance with the invention is characterized by tip-travel which is approximately 10 times greater than that of a Bourdon tube gauge of the same size, so that motion amplification by a linkage or a geared movement is unnecessary. Consequently, the sensor is not subject to the wear, friction and instability during vibration and shock experienced with movements of the type used in conjunction with bourdon tubes.

Moreover, because of the spring-bladder structure of the sensor assembly, it has a life expectancy which is extremely high compared with geared bourdon or other mechanical pressure gauges of comparable cost.

Pointer 16 is mounted on and extends outwardly from a hub post 26 which is rotatable on a pin 27 anchored on the base plate of case 10, whereby the pointer is free to swing along scale 14. In order to operatively couple the free end of the pressure-sensitive assembly 17 to pointer 16, a stiff wire 28 is secured at one end to post 26, the wire extending through hollow rivet 22 at the free end of the assembly and terminating in a bend 28A.

Thus, wire 28 is freely movable in the rivet as the pressure-sensitive assembly 17 more or less straightens out in response to changing values of pressure. The wire functions as a lever whose effective length is equal to the distance between the axis of rotation of the hub post and the rivet on the end of the sensing assembly. In practice, this stiff wire may be made of or coated with Teflon (PTFE) to minimize friction between the wire and the hollow rivet. Accordingly, the straightening out action of the pressure-sensitive assembly in response to fluid pressure is converted into rotary motion to swing the pointer along the scale.

In order to adjust the range of the sensor after it is encased in order to allow for variations normally encountered in production in spring rate or in bladder characteristics, a set screw 29 is provided whose head projects outside of the rear end of the case and is accessible to an operator. The tip of the set screw engages a leaf spring 30 which is interposed between the outer spring 20 of the assembly and a rigid shelf 31 extending from socket 18.

In its initial position, leaf spring 30 rests on shelf 31, but as set screw 30 is axially advanced, it acts to flex the leaf spring upwardly, so that the more this spring is raised, the greater is the portion thereof brought to bear against the pressure-sensitive assembly 17, thereby affecting the range of the assembly. That is to say, the more leaf spring engages the outer spring 20 of the sensitive assembly, the greater is the pressure required to uncoil the assembly, and the higher is the operating range of the sensor.

While there has been shown and described a preferred embodiment of an improved direct-acting pressure sensor in accordance with the invention, it will be appreciated that many changes and modifications may be made therein without, however, departing from the essential spirit thereof.

I claim:

1. A fluid pressure sensor comprising:
   (A) inner and outer flat springs having similarly curved formations and maintained in concentric relation to define a pressure region therebetween;
   (B) a fixed fluid input socket anchoring said springs at one end thereof, the free end of the springs being joined to form a tip whose travel is indicative of fluid pressure, said tip having a hollow rivet attached thereto;
   (C) a flexible bladder occupying said region and having an internal chamber, the faces of said bladder engaging said springs, said internal chamber communicating with said fluid input socket whereby the fluid pressure applied to said chamber through said socket imposes a load on said springs producing deflection thereof whereby said tip is caused to travel, said bladder being fabricated of a sleeve formed of elastomeric material incorporating a helical reinforcing coil whose convolutions are spaced from each other and are joined by said elastomeric material whereby the bladder is free to flex when subjected to fluid pressure but is prevented by the coil from dilating, thereby maintaining a proportional relationship between the applied fluid pressure and the travel of the tip; and
   (D) a pointer operatively coupled to the tip and swingable along a scale graduated in pressure values, said pointer being anchored on a rotatable post to which is secured one end of a wire-like lever which extends through said hollow rivet and is slidable therein whereby the travel of the tip is converted into a pressure indication.

2. A sensor as set forth in claim 1, wherein said sleeve is formed of a rubber-like material and said coil is formed of a synthetic plastic filament wound about the sleeve.

3. A sensor as set forth in claim 1, wherein the convolutions of the coil lie in planes substantially perpendicular to the longitudinal axis of the sleeve.

4. A sensor as set forth in claim 1, wherein said coil is adhesively bonded to the sleeve by an elastomeric bonding agent compatible with the sleeve element.

5. A sensor as set forth in claim 1, further including a set screw to bias the outer spring to adjust the range of the sensor.

* * * * *